United States Patent
Koo et al.

(10) Patent No.: US 7,515,559 B2
(45) Date of Patent: Apr. 7, 2009

(54) HANDOFF SYSTEM USING AN INITIAL RANGING SCHEME IN A BROADBAND WIRELESS ACCESS COMMUNICATION SYSTEM AND METHOD FOR CONTROLLING THE SAME

(75) Inventors: Chang-Hoi Koo, Seongnam-si (KR); Jung-Je Son, Seongnam-si (KR); So-Hyun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 674 days.

(21) Appl. No.: 10/794,988

(22) Filed: Mar. 5, 2004

(65) Prior Publication Data
US 2004/0174845 A1 Sep. 9, 2004

(30) Foreign Application Priority Data
Mar. 8, 2003 (KR) .............. 10-2003-0014569

(51) Int. Cl.
*H04Q 7/00* (2006.01)
(52) U.S. Cl. .............. 370/328; 370/319; 370/320; 370/321; 370/322; 370/329; 370/331; 455/432.1; 455/435.1; 455/435.2; 455/436; 455/450
(58) Field of Classification Search ........ 455/432.1, 455/435.1, 435.2, 436, 459; 370/328, 319, 370/320, 321, 322, 329, 331
See application file for complete search history.

(56) References Cited

U.S. PATENT DOCUMENTS 4,144,411 A * 3/1979 Frenkiel ............... 455/447
5,179,559 A * 1/1993 Crisler et al. ........... 370/332
5,260,943 A * 11/1993 Comroe et al. .......... 370/332
5,345,467 A * 9/1994 Lomp et al. ............ 370/331
5,901,145 A  5/1999 Sawyer (Continued)

FOREIGN PATENT DOCUMENTS

EP  0 888 026  12/1998

(Continued)

OTHER PUBLICATIONS

"Information Technology—Telecommunications and Information Exchange Between Systems—Local and Metropolitan Area Networks—Specific Requirements—Part 11: Wireless LAN Medium Access Control (MAC) and Physical Layer (PHY) Specifications", pp. 1-169, 1997.

(Continued)

*Primary Examiner*—Stephen M D'Agosta
(74) *Attorney, Agent, or Firm*—The Farrell Law Firm, PC

(57) ABSTRACT

A communication system using an OFDM (Orthogonal Frequency Division Multiplexing) scheme. The communication system receives neighbor BS (Base Station) information of a plurality of neighbor BSs associated with a plurality of cells adjacent to a cell and uplink-associated information needed for transmitting data to the first BS from the first BS, requests synchronization information needed for establishing synchronization acquisition between the SS and the first BS from the first BS, monitors the plurality of neighbor BSs on the basis of the neighbor BS information associated with the neighbor BSs, and establishing a handoff with the second BS, which is one of the neighbor BSs, based on the result of the neighbor BSs.

30 Claims, 11 Drawing Sheets

U.S. PATENT DOCUMENTS

| | | | |
|---|---|---|---|
| 6,078,570 A | | 6/2000 | Czaja et al. |
| 6,137,783 A | * | 10/2000 | Sallberg .................... 370/316 |
| 6,526,039 B1 | | 2/2003 | Dahlman et al. |
| 6,721,564 B1 | * | 4/2004 | Kobayashi ................. 455/436 |
| 6,725,052 B1 | * | 4/2004 | Raith ......................... 455/518 |
| 7,072,656 B2 | * | 7/2006 | Willars et al. .............. 455/436 |
| 2005/0059437 A1 | * | 3/2005 | Son et al. ................... 455/574 |
| 2005/0122936 A1 | * | 6/2005 | Son et al. ................... 370/331 |

FOREIGN PATENT DOCUMENTS

| | | |
|---|---|---|
| EP | 1 021 012 | 7/2000 |
| GB | 2 331 892 | 6/1999 |
| JP | 08-098239 | 4/1996 |
| JP | 11-234738 | 8/1999 |
| JP | 2003-018079 | 1/2003 |
| WO | WO 00/21314 | 4/2000 |
| WO | WO 01/60003 | 8/2001 |

OTHER PUBLICATIONS

"Information Technology—Telecommunications and Information Exchange Between Systems—Local and Metropolitan Area Networks—Specific Requirements—Part 11: Wireless LAN Medium Access Control (MAC) and Physical Layer (PHY) Specifications", pp. 70-97, 1999.

Kitroser et al., IEEE 802.16e Mobility Enhancements, Jan. 14, 2003.

* cited by examiner

HANDOFF SYSTEM USING AN INITIAL RANGING SCHEME IN A BROADBAND WIRELESS ACCESS COMMUNICATION SYSTEM AND METHOD FOR CONTROLLING THE SAME

PRIORITY

This application claims priority to an application entitled "HANDOFF SYSTEM USING INITIAL RANGING SCHEME IN BROADBAND WIRELESS ACCESS COMMUNICATION SYSTEM AND METHOD FOR CONTROLLING THE SAME", filed in the Korean Intellectual Property Office on Mar. 8, 2003 and assigned Serial No. 2003-14569, the contents of which are hereby incorporated by reference.

BACKGROUND OF THE INVENTION

1. Field of the Invention

The present invention relates generally to a ranging method for a broadband wireless access communication system, and more particularly to a handoff system using an initial ranging process in a broadband wireless access communication system for use with an OFDM (Orthogonal Frequency Division Multiplexing) scheme, and a method for controlling the same.

2. Description of the Related Art

Recently, many developers have conducted intensive research into the 4G (4th Generation) communication system as one of the next generation communication systems to provide a plurality of users with a specific service having a variety of QoSs (Quality of Services) at a transfer rate of about 100 Mbps. Currently, the 3G (3rd Generation) communication system provides a transfer rate of about 384 kbps in an outdoor channel environment having a relatively poor channel environment, and provides a maximum transfer rate of about 2 Mbps in an indoor channel environment having a relatively good channel environment. A wireless Local Area Network (LAN) system and a wireless Metropolitan Area Network (MAN) system have been designed to provide a transfer rate of 20~50 Mbps. Therefore, there has been newly developed a new communication system based on the 4G communication system to provide the wireless LAN and MAN systems for guaranteeing a relatively high transfer rate with mobility and QoS, and many developers have conducted intensive research into a high-speed service to be provided from the 4G communication system.

The wireless MAN system is suitable for a high-speed communication service because it has a wide coverage area and supports a high-speed transfer rate, but it does not consider the mobility of a subscriber station (SS) at all. As a result, there is no consideration of a handoff operation (i.e., a cell selection operation) caused by the high-speed movement of the SS. The communication system currently considered in IEEE (Institute of Electrical and Electronics Engineers) 802.16a and IEEE 802.16e specifications acts as a specific communication system for performing a ranging operation between the SS and a base station (BS).

FIG. 1 is a block diagram illustrating a broadband wireless access communication system using an OFDM/OFDMA (Orthogonal Frequency Division Multiplexing/Orthogonal Frequency Division Multiple Access) scheme. More specifically, FIG. 1 illustrates the IEEE 802.16a/IEEE 802.16e communication system.

The wireless MAN system, which acts as a BWA (Broadband Wireless Access) communication system, has a much wider coverage are and a much higher transfer rate than the wireless LAN system. When adapting the OFDM scheme and the OFDMA scheme to a physical channel of the wireless MAN system to provide the wireless MAN system with a broadband transmission network, this application system is called an IEEE 802.16a communication system. The IEEE 802.16a communication system applies the OFDM/OFDMA scheme to the wireless MAN system, such that it transmits a physical channel signal using a plurality of sub-carriers, resulting in high-speed data transmission. The IEEE 802.16e communication system has been designed to consider the SS's mobility in the IEEE 802.16a communication system, and there is no detailed specification yet for the IEEE 802.16e communication system.

Referring to FIG. 1, the IEEE 802.16a/IEEE 802.16e communication system has a single cell structure, and includes a BS 100 and a plurality of SSs 110, 120, and 130, which are managed by the BS 100. Signal transmission/reception among the BS 100 and the SSs 110, 120, and 130 can be established using the OFDM/OFDMA scheme. A downlink frame structure for use in the IEEE 802.16a/IEEE 802.16e communication system will hereinafter be described with reference to FIG. 2.

FIG. 2 is a conceptual diagram illustrating the downlink frame structure for use in the BWA communication system using the OFDM/OFDMA scheme. More specifically, FIG. 2 illustrates a downlink frame structure for use in the IEEE 802.16a/IEEE 802.16e communication system.

Referring to FIG. 2, the downlink frame includes a preamble field 200, a broadcast control field 210, and a plurality of TDM (Time Division Multiplexing) fields 220 and 230. A synchronous signal (i.e., a preamble sequence) for acquiring synchronization between the BS and the SSs is transmitted via the preamble field 200. The broadcast control field 210 includes a DL(Downlink)_MAP field 211 and a UL(UpLink)_MAP field 213. The DL_MAP field 211 is used to transmit the DL_MAP message, and a plurality of IEs (Information Elements) contained in the DL_MAP message are shown below in the Table 1.

TABLE 1

| Syntax | Size | Notes |
|---|---|---|
| DL_MAP_Message_Format( ){ | | |
| Management Message Type=2 | 8 bits | |
| PHY Synchronization Field | Variable | See Appropriate PHY specification |
| DCD Count | 8 bits | |
| Base Station ID | 48 bits | |
| Number of DL_MAP Element n | 16 bits | |
| Begin PHY Specific section { | | See Applicable PHY section |
| for (i=1; i<=n; i++) | | For each DL_MAP element 1 to n |
| DL_MAP Information Element( ) | Variable | See corresponding PHY specification |
| If!(byte boundary) { Padding Nibble } | 4 bits | Padding to reach byte boundary |
| } | | |
| } | | |
| } | | |

With reference to Table 1, the DL_MAP message includes a Management Message Type field for indicating a plurality of IEs (i.e., transmission message type information); a PHY (PHYsical) Synchronization field established in response to a modulation or demodulation scheme applied to a physical channel in order to perform synchronization acquisition, a DCD (Downlink Channel Descript) count field for indicating count information in response to a DCD message configuration variation containing a downlink burst profile; a Base Station ID field for indicating a Base Station Identifier; and a Number of DL_MAP Element n field for indicating the number of elements found after the Base Station ID. Particularly, the DL_MAP message (not shown in Table 1) includes information associated with ranging codes allocated to individual ranging processes to be described later.

The UL_MAP field 213 is used to transmit the UL_MAP message. A plurality of IEs contained in the UL_MAP message are shown in Table 2 below

TABLE 2

| Syntax | Size | Notes |
|---|---|---|
| UL_MAP_Message_Format( ){ | | |
| Management Message Type=3 | 8 bits | |
| Uplink Channel ID | 8 bits | |
| UCD Count | 8 bits | |
| Number of UL_MAP Element n | 16 bits | |
| Allocation Start Time | 32 bits | |
| Begin PHY Specific section { | | See Applicable PHY section |
| for (i=1; i<=n, i++) | | For each DL_MAP element 1 to n |
| UL_MAP Information Element( ) | Variable | See corresponding PHY specification |
| } | | |
| } | | |
| } | | |

Referring to Table 2, the UL_MAP message includes a Management Message Type field for indicating a plurality of IEs (i.e., transmission message type information); an Uplink Channel ID field a used Uplink Channel ID; a UCD (Uplink Channel Descript) count field for indicating count information in response to a UCD message configuration variation containing an uplink burst profile; and a Number of UL_MAP Element n field for indicating the number of elements found after the UCD count field. In this case, the uplink channel ID can only be allocated to a Media Access Control (MAC) sub-layer.

The TDM fields 220 and 230 indicate fields corresponding to timeslots allocated using a TDM/TDMA (Time Division Multiple/Time Division Multiple Access) scheme. The BS transmits broadcast information to be broadcast to SSs managed by the BS over the DL_MAP field 211 using a predetermined center carrier. The SSs monitor all the frequency bands having been previously allocated to individual SSs upon receipt of a power-on signal, such that they detect a pilot channel signal having the highest signal strength, i.e., the highest pilot CINR (Carrier to Interference and Noise Ratio). It is determined that the SS belongs to a specific BS that has transmitted the pilot channel signal with the highest pilot CINR. The SSs check the DL_MAP field 211 and the UL_MAP field 213 of the downlink frame having been transmitted from the BS, such that they recognize their own uplink and downlink control information and specific information for indicating a real data transmission/reception position.

The aforementioned UCD message configuration is shown below in Table 3:

TABLE 3

| Syntax | Size | Notes |
|---|---|---|
| UCD-Message_Format( ){ | | |
| Management Message Type=0 | 8 bits | |
| Unlink channel ID | 8 bits | |
| Configuration Change Count | 8 bits | |

TABLE 3-continued

| Syntax | Size | Notes |
|---|---|---|
| Mini-slot size | 8 bits | |
| Ranging Backoff Start | 8 bits | |
| Ranging Backoff End | 8 bits | |
| Request Backoff Start | 8 bits | |
| Request Backoff End | 8 bits | |
| TLV Encoded Information for the overall channel | Variable | |
| Begin PHY Specific Section { | | |
| for (i=1; i<n; i+n) | | |
| Uplink_Burst_Descriptor | Variable | |
| } | | |
| } | | |
| } | | |

Referring to Table 3, the UCD message includes a Management Message Type field for indicating a plurality of Es (ie., transmission message type information), an Uplink Channel ID field for indicating a used Uplink Channel Identifier; a Configuration Change Count field counted by the BS; a mini-slot size field for indicating the size of the mini-slot of the uplink physical channel; a Ranging Backoff Start field for indicating a backoff start point for an initial ranging process, i.e., an initial backoff window size for the initial ranging process; a Ranging Backoff End field for indicating a backoff end point for the initial ranging process, i.e., a final backoff window size; a Request Backoff Start field for indicating a backoff start point for establishing contention data and requests, i.e., an initial backoff window size; and a Request Backoff End field for indicating a backoff end point for establishing contention data and requests, i.e., a final backoff window size. In this case, the backoff value indicates a kind of standby time, which is a duration time between the start of SS's access failure and the start of SS's re-access time. If the SS fails to execute an initial ranging process, the BS must transmit the backoff values for indicating standby time information for which the SS must wait for the next ranging process to the SS. For example, provided that a specific number of 10 is determined by the "Ranging Backoff Start" and "Ranging Backoff End" fields shown in Table 3, the SS must pass over $2^{10}$ access executable chances (i.e., 1024-times access executable chances) and then execute the next ranging process according to the Truncated Binary Exponential Backoff Algorithm.

FIG. 3 is a conceptual diagram illustrating an uplink frame structure for use in a BWA communication system using an OFDM/OFDMA scheme. More specifically, FIG. 3 illustrates an uplink frame structure for use in the IEEE 802.16a/IEEE 802.16e communication system.

Prior to describing the uplink frame structure illustrated in FIG. 3, three ranging processes for use in the IEEE 802.16a/IEEE 802.16e communication system, i.e., an initial ranging process, a maintenance ranging process (also called a period ranging process), and a bandwidth request ranging process, will hereinafter be described in detail.

The initial ranging process for establishing synchronization acquisition between the BS and the SS establishes a correct time offset between the SS and the BS, and is used to control a transmission power (also called a transmit power). More specifically, the SS is powered on, and receives the DL_MAP message, the UL_MAP message, and the UCD message to establish synchronization with the BS in such a way that it performs the initial ranging process to control the transmission power between the BS and the time offset. In this case, the IEEE 802.16a/IEEE 802.16e communication system uses the OFDM/OFDMA scheme, such that the ranging procedure requires a plurality of ranging sub-channels and a plurality of ranging codes. The BS allocates available ranging codes to the SS according to objectives of the ranging processes (i.e., the ranging process type information). This operation will be described in more detail herein below.

The ranging codes are created by segmenting a PN (Pseudorandom Noise) sequence having a length of $2^{15}-1$ bits into predetermined units. Typically, one ranging channel includes two ranging sub-channels, each having a length of 53 bits. PN code segmentation is executed over the ranging channel having the length of 106 bits, resulting in the creation of a ranging code. A maximum of 48 ranging codes RC#1~RC#48 can be assigned to the SS. More than two ranging codes for every SS are applied as a default value to the three ranging processes having different objectives, i.e., an initial ranging process, a period ranging process, and a bandwidth request ranging process. As a result, a ranging code is differently assigned to the SS according to each objective of the three ranging processes.

For example, N ranging codes are assigned to the SS for the initial ranging process as denoted by a prescribed term of "N RC (Ranging Codes) for Initial Ranging", M ranging codes are assigned to the SS for the periodic ranging process as denoted by a prescribed term of "M RCs for maintenance ranging", and L ranging codes are assigned to the SS for the bandwidth request ranging process as denoted by a prescribed term of "L RCs for BW-request ranging". The assigned ranging codes are transmitted to the SSs using the DL_MAP message, and the SSs perform necessary ranging procedures using the ranging codes contained in the DL_MAP message.

A period ranging process is periodically executed such that an SS, which has controlled a time offset between the SS and the BS and a transmission power in the initial ranging process, can control a channel state associated with the BS. The SS performs the period ranging process using the ranging codes assigned for the period ranging process.

A bandwidth request ranging process is used to enable the SS, which has controlled a time offset between the SS and the BS and a transmission power in the initial ranging process, to request a bandwidth allocation from the BS in such a way that the SS can communicate with the BS.

Referring to FIG. 3, the uplink frame includes an initial maintenance opportunity field 300 using the initial and period ranging processes, a request contention opportunity field 310 using the bandwidth request ranging process, and an SS scheduled data field 320 including uplink data of a plurality of SSs. The initial maintenance opportunity field 300 includes a plurality of access burst fields, each having real initial and period ranging processes, and a collision field in which there is a collision between the access burst fields. The request contention opportunity field 310 includes a plurality of bandwidth request fields each having a real bandwidth request ranging process, and a collision field in which there is a collision between the bandwidth request ranging fields. The SS scheduled data fields 320 each include a plurality of SS scheduled data fields (i.e., SS 1 scheduled data field~SS N scheduled data field). The SS transition gap is positioned between the SS scheduled data fields (i.e., SS 1 scheduled data field~SS N scheduled data field).

As described above, the IEEE 802.16a communication system has considered a fixed state of a current SS (i.e., there is no consideration given to the mobility of the SS) and a single cell structure. However, the IEEE 802.16e communication system has been defined as a system for considering the SS's mobility in the IEEE 802.16a communication system, such that the IEEE 802.16e communication system must consider the SS's mobility in a multi-cell environment. In order to provide the SS's mobility in the multi-cell environment, individual operations modes of the SS and the BS must be converted into others. However, the IEEE 802.16e communication system has not proposed a new method for improving the SS's mobility in the multi-cell environment. Therefore, an SS handoff system considering a multi-cell structure to provide the IEEE 802.16e communication system with the SS's mobility must be developed.

SUMMARY OF THE INVENTION

Therefore, the present invention has been designed in view of the above and other problems, and it is an object of the present invention to provide a handoff system and method for guaranteeing the SS's mobility in a BWA communication system.

It is another object of the present invention to provide a handoff system and method using an initial ranging process in a BWA communication system.

In accordance with one aspect of the present invention, the above and other objects can be accomplished by a base station (BS) handoff method using an initial ranging process in a communication system for use with an OFDM (Orthogonal Frequency Division Multiplexing) scheme, comprising the steps of a) broadcasting neighbor BS information, downlink information including initial ranging information, and uplink information to a plurality of SSs (Subscriber Stations) located within a cell controlled by the BS; b) upon receiving an initial ranging request from a SS from among the plurality of SSs, transmitting an initial ranging response associated with the initial ranging request to the SS; and c) determining whether a response generated from the SS is generated during a predetermined setup time after transmitting the initial ranging response, and determining whether the SS is handed off according to the determined result.

In accordance with another aspect of the present invention, there is provided an SS (Subscriber Station) handoff method in a communication system using an OFDM (Orthogonal Frequency Division Multiplexing) scheme, comprising the steps of: a) receiving a variety of information, i.e., neighbor BS (Base Station) information of a plurality of neighbor BSs associated with a plurality of cells adjacent to a cell and uplink-associated information needed for transmitting data from the SS to a first BS, from the first BS for controlling the cell currently containing the SS; b) requesting synchronization information needed for establishing synchronization acquisition between the SS and the first BS from the first BS; c) monitoring the plurality of neighbor BSs on the basis of the neighbor BS information associated with the plurality of neighbor BSs; and d) establishing a handoff with a second BS which is one of the plurality of neighbor BSs based on the monitored result.

In accordance with yet another aspect of the present invention, there is provided an SS (Subscriber Station) handoff method using an initial ranging process in a communication system using an OFDM (Orthogonal Frequency Division Multiplexing) scheme, comprising the steps of: a) receiving neighbor BS information broadcast from a first BS to which the SS currently belongs, downlink information containing initial ranging information, and uplink information allocated to the SS; b) requesting an initial ranging process from the first BS using the initial ranging information and uplink information received from the first BS; c) monitoring the neighbor BSs in response to the neighbor BS information; d) if a specific state where a handoff state must be established with the second BS from among the neighbor BSs is detected during the monitoring time of the neighbor BSs, receiving downlink information and uplink information broadcast from a second BS; and e) requesting an initial ranging process from the second BS using the initial ranging information and the uplink information received from the second BS.

In accordance with yet another aspect of the present invention, there is provided a handoff apparatus using an initial ranging process in a communication system using an OFDM (Orthogonal Frequency Division Multiplexing) scheme, comprising: a BS (Base Station) for broadcasting neighbor BS information, downlink information with initial ranging information, and uplink information allocated to a plurality of SSs (Subscriber Stations) to the SSs contained in a cell, and transmitting an initial ranging response answering an initial ranging request upon receiving the initial ranging request from a SS from among the SSs; and an SS for receiving the downlink information and the uplink information broadcast from the BS, requesting an initial ranging process from the BS using the received initial ranging information and uplink information, monitoring neighbor BSs in response to the neighbor BS information, determining whether a handoff state must be established with a new BS different from the BS from among the neighbor BSs, receiving downlink and uplink information broadcast from the new BS if it is determined that the handoff state must be established with the new BS, and requesting the initial ranging process from the new BS using the initial ranging information and the uplink information received from the new BS.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
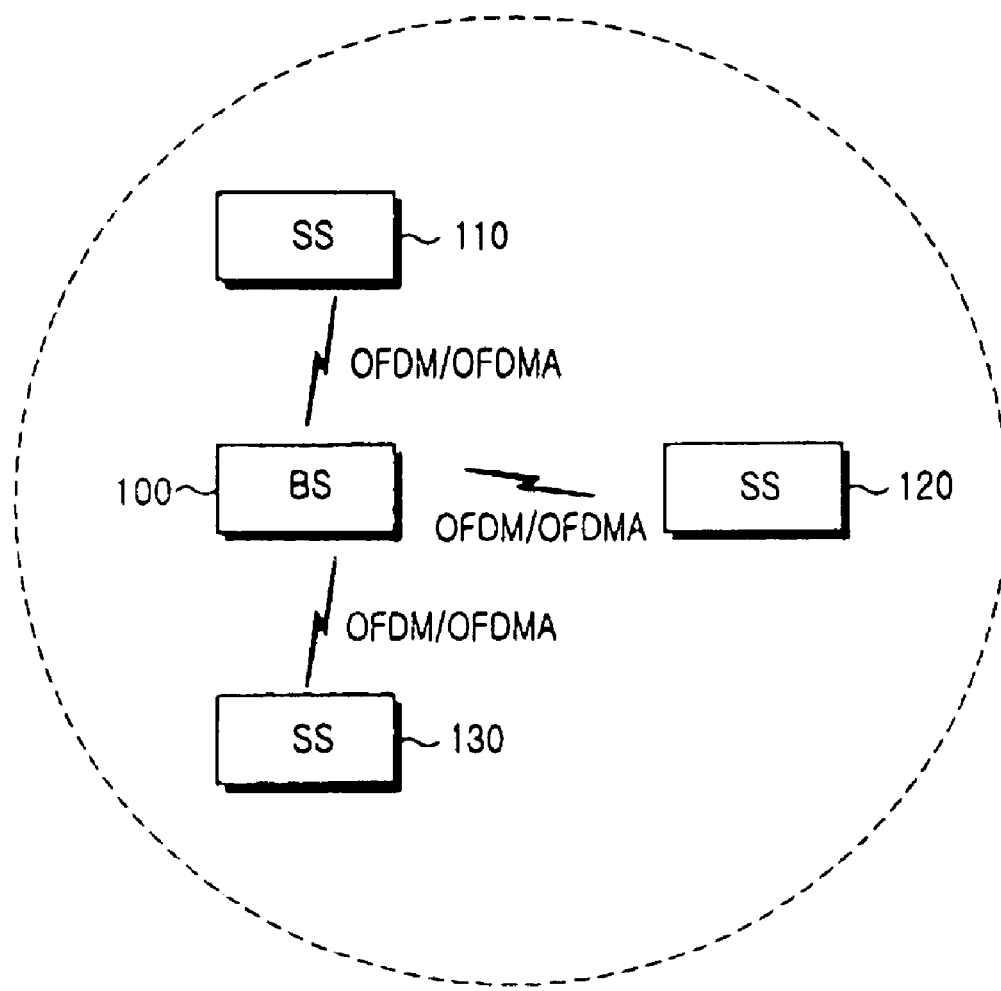
FIG. 1 is a block diagram illustrating a BWA (Broadband Wireless Access) communication system using an OFDM/OFDMA scheme.
Figure 2:
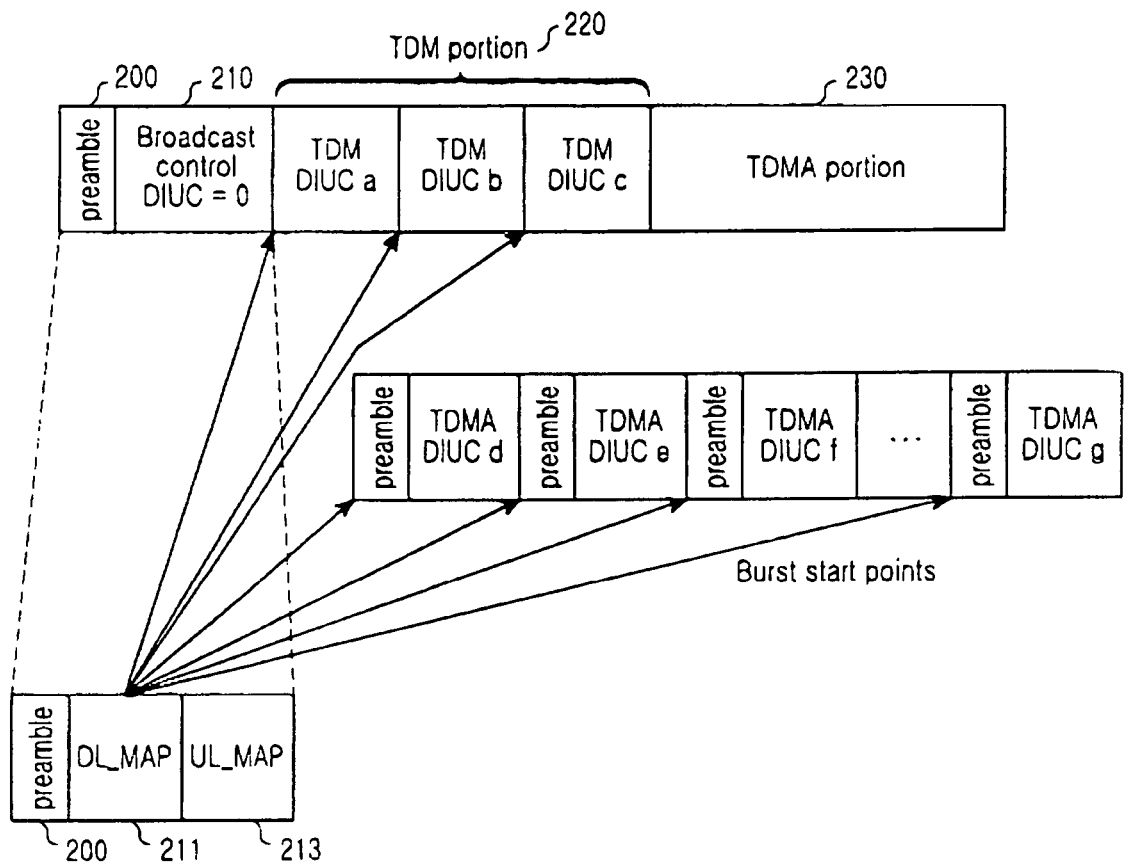
FIG. 2 is a diagram illustrating a downlink frame structure for use in a BWA communication system using an OFDM/OFDMA scheme.
Figure 3:
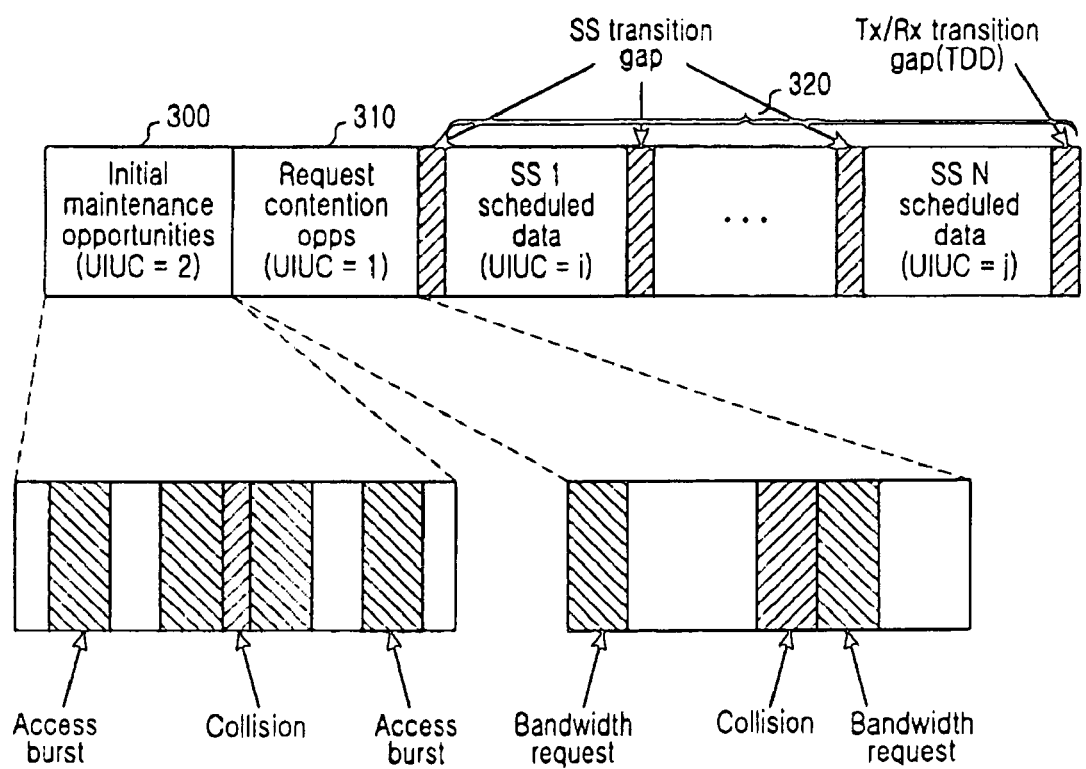
FIG. 3 is a diagram illustrating an uplink frame structure for use in a BWA communication system using an OFDM/OFDMA scheme.

Preferred embodiments of the present invention will be described in detail herein below with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 4:
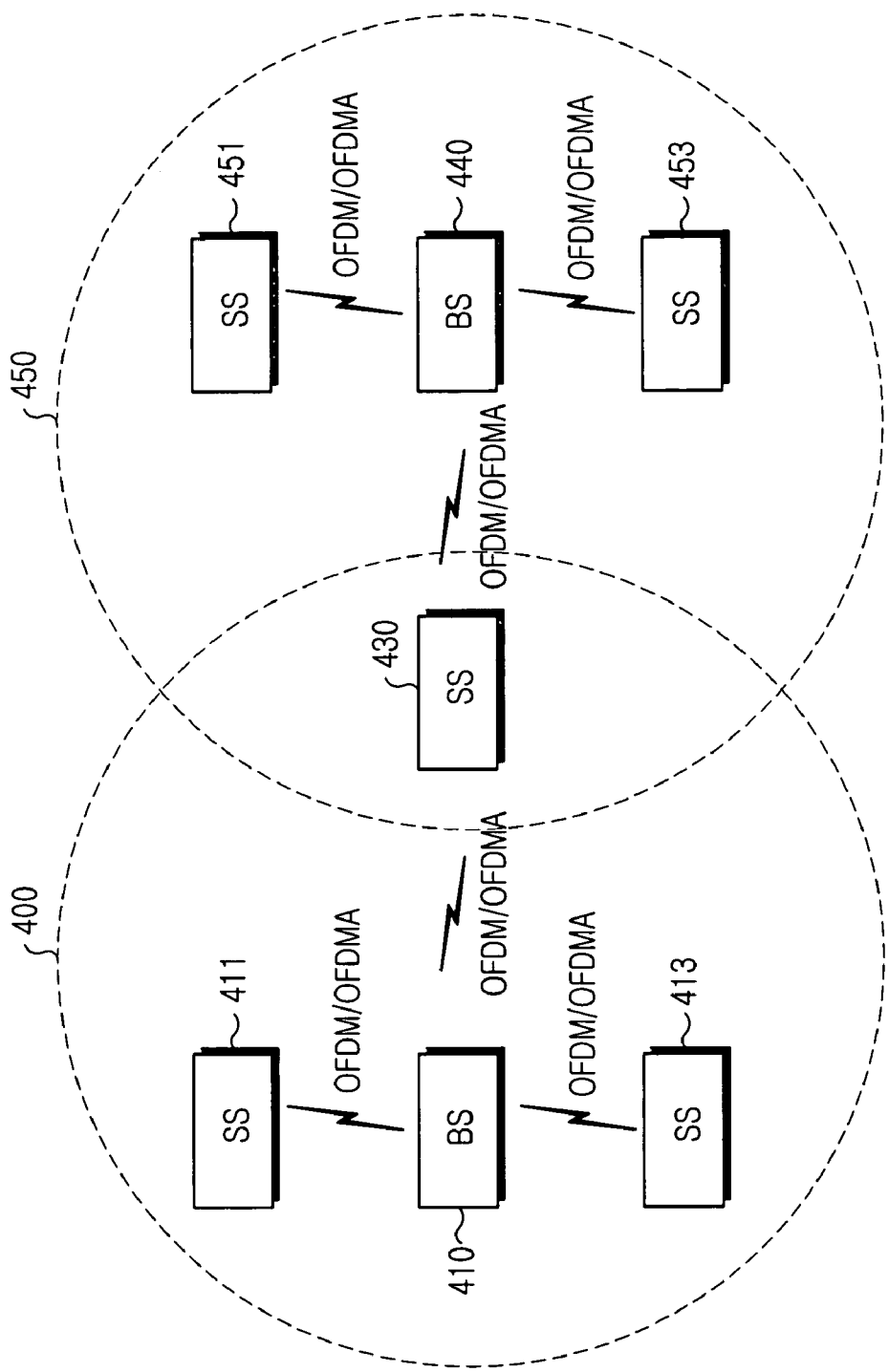
FIG. 4 is a block diagram illustrating a BWA communication system using an OFDM/OFDMA scheme in accordance with a preferred embodiment of the present invention.

FIG. 4 is a block diagram illustrating a BWA communication system using an OFDM/OFDMA scheme in accordance with a preferred embodiment of the present invention.

Prior to describing the BWA communication system illustrated in FIG. 4, it should be noted that the IEEE 802.16e communication system acting as a communication system for considering the SS's mobility in the IEEE 802.16a communication system has not been developed yet. Provided that the SS's mobility is considered in the IEEE 802.16a communication system, it is possible to consider the multi-cell structure and an SS's handoff operation (i.e., a cell selection operation) between the multi-cells. Therefore, the present invention provides the IEEE 802.16e communication system as illustrated in FIG. 4. The IEEE 802.16e communication system acts as a BWA communication system using the OFDM/OFDMA scheme.

Referring to FIG. 4, the IEEE 802.16e communication system includes a multi-cell structure, i.e., a plurality of cells 400 and 450. More specifically, the IEEE 802.16e communication system includes a first BS 410 for managing the cell 400, a second BS 440 for managing the cell 450, and a plurality of SSs 411, 413, 430, 451, and 453. Signal transmission/reception among the BSs 410 and 440 and the SSs 411, 413, 430, 451, and 453 is established using the OFDM/OFDMA scheme. The SS 430 from among the SSs 411, 413, 430, 451, and 453 is positioned in a boundary (i.e., a handoff area) between the first cell 400 and the second cell 450. The IEEE 802.16e communication system can provide the SS's mobility on the condition that the handoff operation for the SS 430 is supported.

In order to enable the IEEE 802.16e communication system not supporting the handoff operation for the SS to support the handoff operation, the IEEE 802.16e communication system must define a new MAC (Media Access Control) management message, or must transmit handoff-associated information needed to support the handoff operation to the SS using the DL_MAP message. For the convenience of description, it is assumed that the present invention provides the SS with the handoff-associated information using the DL_MAP message for use in the IEEE 802.16a communication system. As previously stated above in the prior art, the DL_MAP message for use in the IEEE 802.16a communication system is a message generated by considering only a single cell structure without consideration of the SS's mobility, such that the present invention must be designed to add the handoff-associated information in an additional field. A plurality of Es (Information Elements) contained in the DL_MAP message containing the handoff-associated information are shown in Table 4 below.

TABLE 4

| Syntax | Size | Notes |
|---|---|---|
| DL_MAP_Message_Format( ){ | | |
| Management Message Type=2 | 8 bits | |
| PHY Synchronization Field | Variable | See Appropriate PHY specification |
| DCD Count | 8 bits | |
| Base Station ID | 48 bits | |
| Number of DL_MAP Element n | 16 bits | |
| Number of Neighbor BS n | 8 bits | The number of added neighbor BSs |
|     for (k=1; k<=n; k++) | | |
| Neighbor list BS ID | 48 bits | IDs of neighbor list BSs |
| Neighbor Frequency | 8 bits | Frequencies of neighbor BSs |
| Neighbor Frame offset | 8 bits | Neighbor BSs' frame offset |
|     Idle HO support | 1 bit | Idle HO support or nonsupport of neighbor BSs |
|     } | | |
| Begin PHY Specific section { | | See Applicable PHY section |
|     for (I=1; i<=n; i++) | | For each DL_MAP element 1 to n |
| DL_MAP Information Element( ) | Variable | See corresponding PHY specification |
|     if!(byte boundary) { | 4 bits | Padding to reach byte boundary |
|         Padding Nibble | | |
|         } | | |
|     } | | |
|     } | | |
| } | | |

Referring to Table 4, the DL_MAP message includes a Management Message Type field for indicating a plurality of IEs; a PHY Synchronization field established in response to a modulation or demodulation scheme applied to a physical channel in order to perform synchronization acquisition; a DCD count field for indicating count information in response to a DCD message configuration variation containing a downlink burst profile; a Base Station ID field for indicating a Base Station Identifier; and a Number of DL_MAP Elements n field for indicating the number of elements found after the Base Station ID. More specifically, as shown in Table 4, the DL_MAP message includes handoff-associated information as mandatory information. In this case, the handoff-associated information is contained in the Number of Neighbor BS n field. The Number of Neighbor BS n field is repeatedly recorded in association with the number "n" of neighbor BSs that must be continuously monitored to perform the handoff operation of the SS. The Number of Neighbor BS n field includes a Neighbor list BS ID field for indicating individual Base Station IDs of neighbor BSs, a Neighbor Frequency field for indicating center frequency information for use in individual neighbor BSs, a Neighbor Frame Offset field for indicating individual frame offset information of the neighbor BSs, and an Idle HO support field for indicating idle handoff support or nonsupport information of individual neighbor BSs. In this case, the frame offset field indicates the frame offset between the neighbor BSs when the IEEE 802.16e communication system supports a soft handoff function instead of a hard handoff function. The idle handoff field indicates a specific handoff function indicating that the BS is re-selected on the condition that the SS does not substantially establish a call connection state with the BS. More specifically, the idle handoff function is executed on the condition that there is no real traffic. The DL_MAP message (not shown in Table 4) includes information associated with ranging codes allocated to individual ranging processes.

Figure 5:
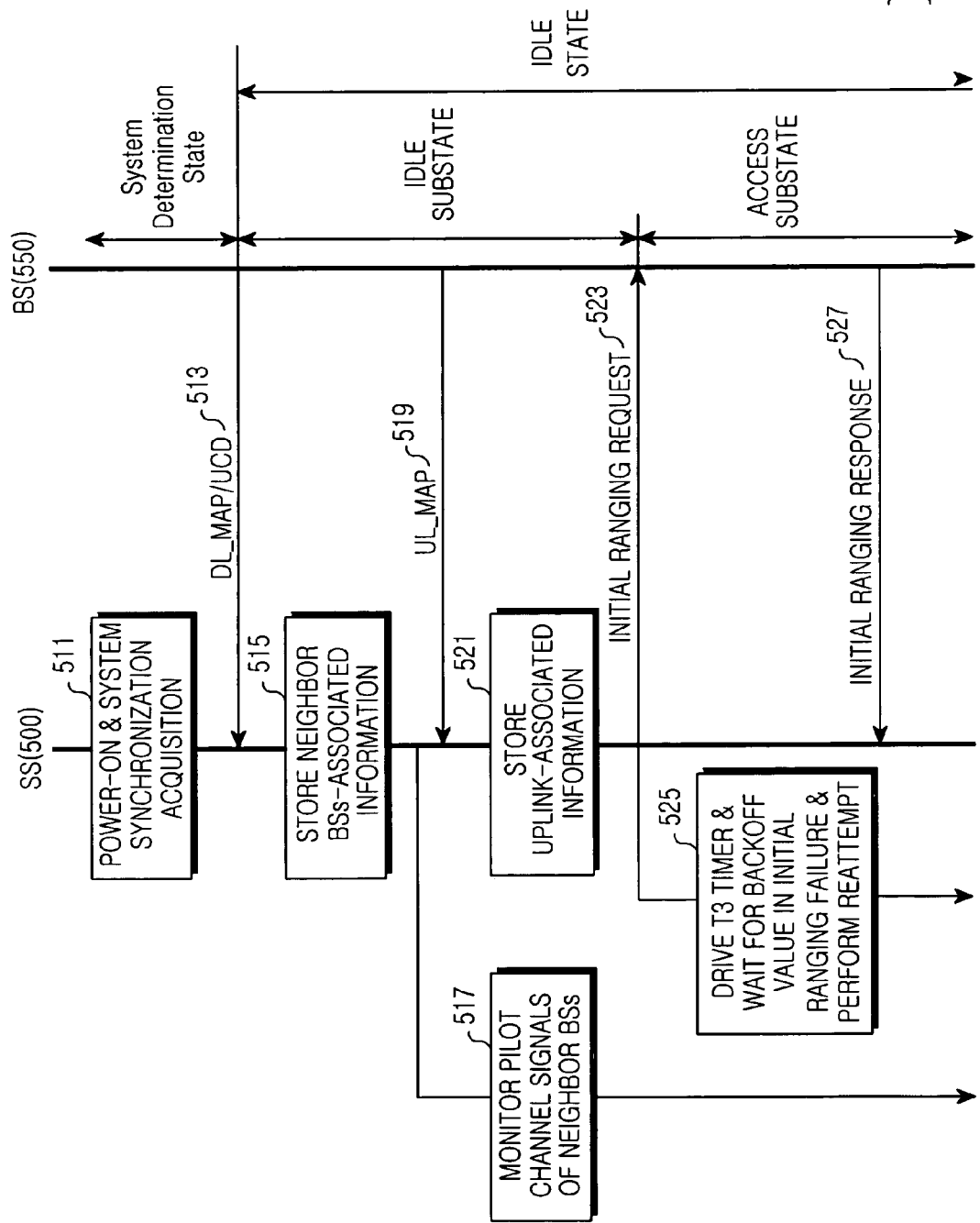
FIG. 5 is a flow chart illustrating an initial ranging process for use in the BWA communication system using the OFDM/OFDMA scheme in accordance with a preferred embodiment of the present invention.

FIG. 5 is a flow chart illustrating an initial ranging process for use in the BWA communication system using the OFDM/OFDMA scheme in accordance with a preferred embodiment of the present invention. Referring to FIG. 5, the SS 500 monitors all of its own predetermined frequencies upon receipt of a power-on signal, such that it detects a pilot channel signal having a highest pilot CINR. It is determined that SS 500 belongs to the specific BS 550 that has transmitted the pilot channel signal with the highest pilot CINR. The SS 500 receives a downlink frame preamble from the BS 550, such that it acquires system synchronization with the BS 550 at step 511. The aforementioned state in which the SS 500 can acquire system synchronization with the BS 550 upon receipt of the power-on signal is called a System Determination State.

Upon establishing synchronization between the SS 500 and the BS 500, the SS 500 is transitioned from the system determination state to an idle sub-state of an idle state. The idle state is classified into an idle sub-state and an access sub-state. The idle sub-sate and the access sub-state will be described later. As stated above, upon synchronizing the SS 500 and the BS 550, the BS 550 transmits the DL_MAP message and the UCD message to the SS 500 at step 513. The DL_MAP message includes information shown in Table 4, for example, information associated with ranging codes and handoff-associated information, etc. The UCD message includes information shown in Table 3 of the prior art, for example, a backoff value, etc. The BS 550 is transitioned from a transmission start time of the DL_MAP message to the idle sub-state.

Upon receiving the DL_MAP message and the UCD message from the BS 550, the SS 500 detects the handoff-associated information contained in the DL_MAP message, i.e., information associated with neighbor BSs, by analyzing the Number of Neighbor BS n field having the neighbor BSs associated information. More specifically, the neighbor BSs-associated information includes neighbor list BS ID information for indicating each BS ID information of individual neighbor BSs, neighbor frequency information for indicating center frequency information for use in individual neighbor BSs, neighbor frame offset information for indicating frame offset information of individual neighbor BSs, and idle HO support information for indicating idle handoff support or unsupport information of individual neighbor BSs. The SS 500 stores the detected neighbor BSs-associated information in its own internal memory at step 515. The neighbor BSs-associated information can be updated upon receiving the DL_MAP message. The SS 500 stores the neighbor BSs-associated information, and continues to monitor individual pilot channel signals of the neighbor BSs, such that it continuously determines whether there is a specific BS for transmitting a pilot channel signal stronger than the pilot channel signal of the BS 550 controlling the SS 500 at step 517.

If the SS 500 detects the BS which has transmitted the pilot channel signal stronger than the BS 550's pilot channel signal while monitoring individual pilot channel signals of the neighbor BSs, it is determined that the SS 500 must be handed off. It should be assumed that the pilot channel signal of the BS 550 to which the SS 500 belongs is stronger than the pilot channel signals transferred from the neighbor BSs in FIG. 5.

The BS 550 transmits the DL_MAP message, and then transmits the UL_MAP message to the SS 500 at step 519. In this case, the DL_MAP message and the UL_MAP message are substantially multiplexed to one downlink frame and are then transmitted, such that their transmission order may not be a sequential order but a simultaneous order. It should be noted that FIG. 5 sequentially illustrates the DL_MAP message transmission and the UL_MAP message transmission for the convenience of description.

Upon receiving the UL_MAP message from the BS 550, the SS 500 detects uplink-associated information contained in the UL_MAP message, and stores the detected uplink-associated information in the SS 500's internal memory at step 521. In this case, the uplink-associated information can be updated upon receiving the UL_MAP message. The SS 500 stores the uplink-associated information, and transmits an initial ranging request message to the BS 550 at step 523. Upon receiving the initial ranging request message, the SS 500 is transitioned from the idle sub-state to the access sub-state. In this case, the initial ranging process establishes a correct time offset between the SS 500 and the BS 550, and controls a transmission power. The idle sub-state indicates a specific state ranging from a transmission time at which the BS 550 transmits the DL_MAP and UCD messages to a reception time of the initial ranging request message.

The SS 500 transmits the initial ranging request message, and at the same time operates a T3 timer. The T3 timer waits for an initial ranging response message acting as a response message to the initial ranging request message to be received from the BS 550 during a predetermined setup time. For example, the predetermined setup time for waiting for the initial ranging response message of the T3 timer may be set to a maximum of 200 ms. Provided that the initial ranging response message is not received even though the T3 timer has expired, the SS 500 enters a waiting mode during a predetermined time corresponding to a backoff value contained in the UCD message, re-transmits the initial ranging request message to the BS 550, and re-attempts the initial ranging process at step 525.

Upon receiving the initial ranging request message from the SS 500, the BS 550 is transitioned from the idle sub-state to the access sub-state. The BS 550 transmits the initial ranging response message to the SS 500 upon receiving the initial ranging request message at step 527. In this case, the access sub-state is a specific state ranging from the initial ranging request message reception time of the BS 550 to the initial ranging request message transmission time of the BS 550.

Figure 6:
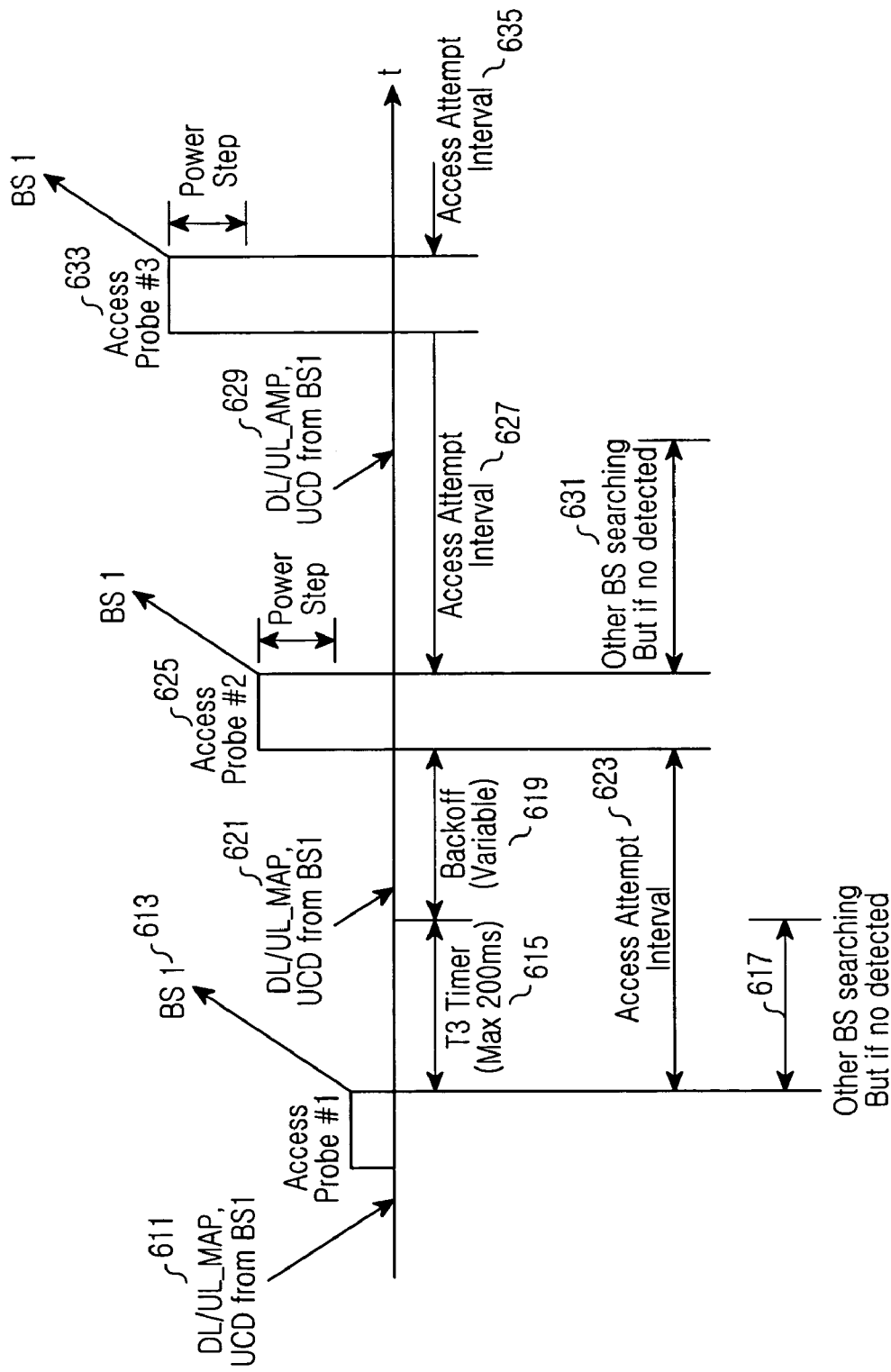
FIG. 6 is a diagram illustrating an initial ranging operation of the SS contained in a non-handoff area in the BWA communication system using the OFDM/OFDMA scheme in accordance with a preferred embodiment of the present invention.

FIG. 6 is a diagram illustrating an initial ranging operation of the SS located within a non-handoff area in the BWA communication system using the OFDM/OFDMA scheme in accordance with a preferred embodiment of the present invention. Referring to FIG. 6, the SS receives the DL_MAP message, the UL_MAP message, and the UCD message from a first BS (BS1) at step 611. The SS monitors a plurality of neighbor BSs (e.g., six neighbor BSs) other than its own current BS to perform a handoff operation, such that the current BS of the SS is called the first BS for the convenience of description.

Upon receiving the DL_MAP message, the UL_MAP message, and the UCD message from the first BS, the SS transmits access probe for indicating physical layer indicative data through which the initial ranging request message is actually transmitted, to the first BS at step 613. In this case, it should be noted that the access probe for firstly transmitting the initial ranging request message is called a first access probe denoted by Access Probe #1. The SS operates the T3 timer simultaneously with transmitting the first access probe, such that it waits for the initial ranging response message associated with the first initial ranging request message to be received from the first BS at step 615. It is assumed that the T3 timer waits for a predetermined time (e.g., a maximum of 200 ms). The SS operates the T3 timer, and at the same time continues to monitor six neighbor BSs at step 617.

Provided that the initial ranging response message is not received from the first BS before reaching an operation termination time of the T3 timer, the SS waits for a predetermined time corresponding to a predetermined backoff value at step 619. Because the SS is located in a non-handoff area in FIG. 6, it cannot detect a BS capable of transmitting a pilot channel signal stronger than a transmission pilot channel signal of the first BS even though six neighbor BSs are monitored, so that the SS continuously receives the DL_MAP message, the UL_MAP message, and the UCD message from the first BS at step 621. The waiting time (also called a standby time) of the T3 timer and the other waiting time, corresponding to the backoff value, result in an access attempt interval at step 623. As a result, provided that the initial ranging response message is received from the first BS during the waiting time of the T3 timer, there is no need for the SS to perform additional operations using the above initial ranging process. It should be noted that FIG. 6 assumes a predetermined condition where the initial ranging response message to the first initial ranging request message is not received.

As described above, if the initial ranging response message to the first initial ranging request message has not been received during the waiting time of the T3 timer, the SS transmits access probe data with a second initial ranging request message to the first BS at step 625 after the lapse of the waiting time corresponding to the backoff value. In this case, it should be noted that the access probe for transmitting the second initial ranging request message is called a second access probe denoted by Access Probe #2. The transmission power for transmitting the second access probe is determined to be higher than that of the first access probe by a predetermined magnitude (i.e., a power step), in order to solve a poor wireless channel environment between the first BS and the SS.

The SS performs an operation of the access attempt interval (i.e., the T3 timer setup operation) at a time of transmitting the second access probe, such that it waits for the initial ranging response message associated with the second initial ranging request message to be received from the first BS. Provided that the SS does not receive the initial ranging response message associated with the second initial ranging request message during the waiting time of the T3 timer, it performs consecutive operations such as a standby operation in response to the predetermined backoff value at step 627. In this case, the SS is located in a non-handoff area. Although the SS monitors six neighbor BSs at step 631, it cannot detect a BS capable of transmitting a pilot channel signal stronger than a transmission pilot channel signal of the first BS, so that the SS continuously receives the DL_MAP message, the UL_MAP message, and the UCD message from the first BS at step 629.

Provided that the initial ranging response message to the second initial ranging request message is not received even in a corresponding access attempt interval, the SS transmits the access probe with a third initial ranging request message to the first BS at step 633. In this case, it should be noted that the access probe for transmitting the third initial ranging request message is called a third access probe denoted by Access Probe #3. The transmission power for transmitting the third access probe is determined to be higher than that of the second access probe by a predetermined power step, in order to solve a poor wireless channel environment between the first BS and the SS. The SS performs an operation of the access attempt interval (i.e., the T3 timer setup operation) at a time of transmitting the third access probe, such that it waits for the initial ranging response message associated with the third initial ranging request message to be received from the first BS. Provided that the SS does not receive the initial ranging response message associated with the third initial ranging request message during the waiting time of the T3 timer, it performs consecutive operations such as a standby operation in response to the predetermined backoff value at step 635.

Figure 7:
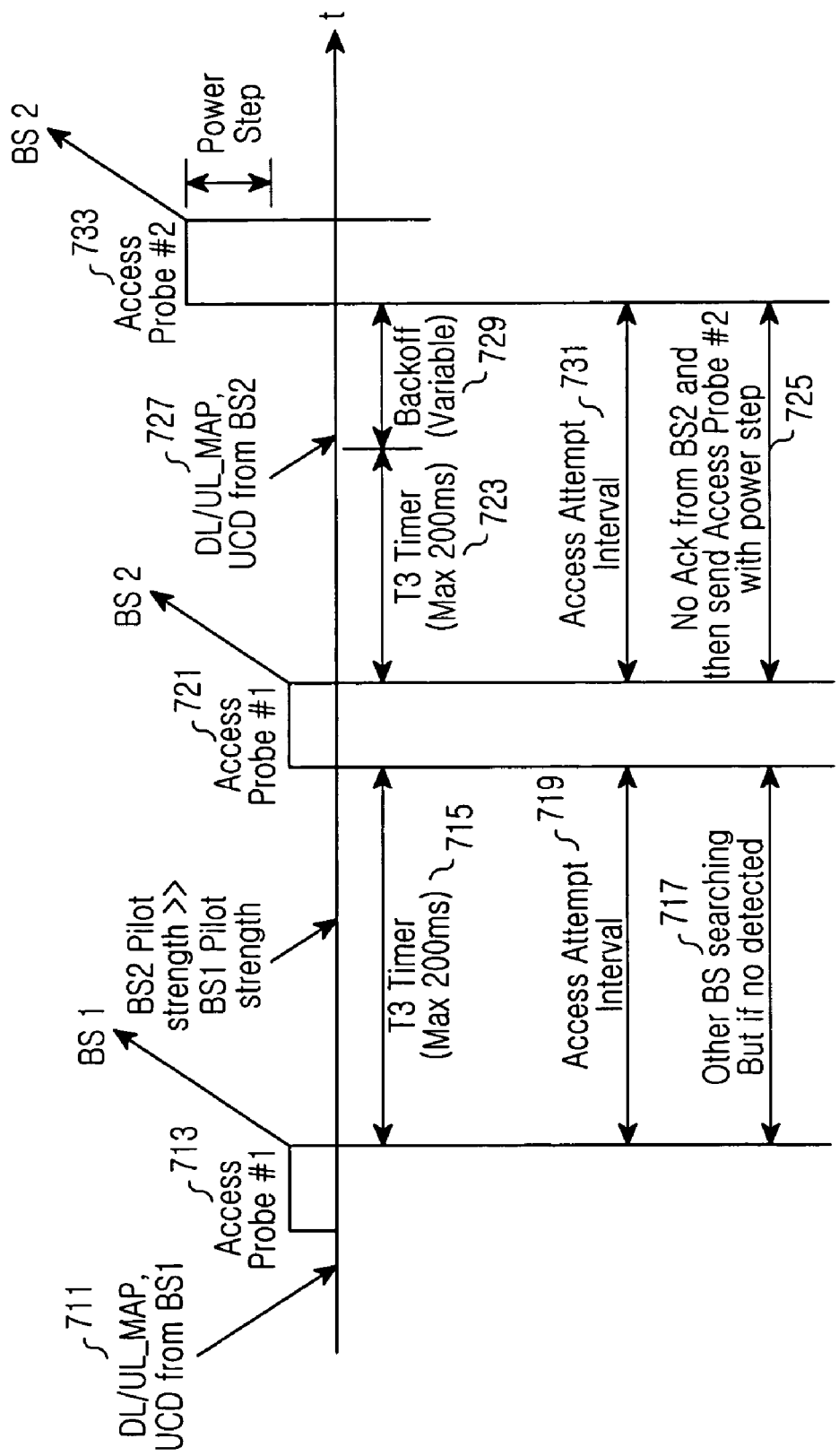
FIG. 7 is a diagram illustrating an initial ranging operation of the SS contained in a handoff area in the BWA communication system using the OFDM/OFDMA scheme in accordance with a preferred embodiment of the present invention.

FIG. 7 is a diagram illustrating an initial ranging operation of the SS contained in a handoff area in the BWA communication system using the OFDM/OFDMA scheme in accordance with a preferred embodiment of the present invention. Referring to FIG. 7, the SS receives the DL_MAP message, the UL_MAP message, and the UCD message from the first BS (BS 1) at step 711. The SS monitors a plurality of neighbor BSs (e.g., six neighbor BSs) other than its own current BS to perform a handoff operation, such that the current BS of the SS is called the first BS for the convenience of description.

Upon receiving the DL_MAP message, the UL_MAP message, and the UCD message from the first BS, the SS transmits access probe for indicating data of a physical layer through which the initial ranging request message is transmitted, to the first BS at step 713. In this case, it should be noted that the access probe for transmitting the first initial ranging request message is called a first access probe denoted by Access Probe #1. The SS operates the T3 timer simultaneously with transmitting the first access probe, such that it waits for the initial ranging response message associated with the first initial ranging request message to be received from the first BS at step 715. It is assumed that the T3 timer waits for a predetermined time (e.g., a maximum of 200 ms). The SS sets up the T3 timer, and at the same time continues to monitor six neighbor BSs at step 717.

The SS is located in the handoff area in FIG. 7, and it can detect a BS capable of transmitting a pilot channel signal stronger than a transmission pilot channel signal of the first BS when monitoring six neighbor BSs. In this case, the BS capable of transmitting the pilot channel signal stronger than the transmission pilot channel signal of the first BS is called a second BS (BS 2). If the second BS has been detected, the SS escapes from the waiting mode for receiving the initial ranging response message associated with the first initial ranging request message from the first BS, and transmits the first access probe containing the first initial ranging request message to the second BS at step 721. In this case, the waiting time of the T3 timer results in an access attempt interval at step 719. The first access probe's transmission power transmitted to the second BS is equal to the other first access probe's transmission power transmitted to the first BS, thereby preventing the first access probe with the increased transmission power from acting as an interference component associated with other signals when the first access probe's transmission power is unconditionally increased by a power step and is transmitted. The SS can receive the DL_MAP message, the UL_MAP message, and the UCD message from the second BS during the access attempt interval 719 via a center frequency of the second BS using neighbor BS information having been previously received in the first BS. Therefore, the SS is synchronized with the second BS, and can transmit the first access probe to the second BS.

Again, the SS operates the T3 timer simultaneously with transmitting the first access probe, such that it waits for the initial ranging response message associated with the first initial ranging request message to be received from the second BS at step 723. The SS operates the T3 timer, and at the same time continues to monitor six neighbor BSs at step 725. Because a specific BS capable of transmitting a pilot channel signal stronger than a transrmission pilot channel signal of the second BS is not detected even though the six neighbor BSs have been monitored, the SS receives the DL_MAP message, the UL_MAP message, and the UCD message from the second BS at step 727. Provided that the initial ranging response message is not received from the second BS while the T3 timer is completely driven during the time of 200 ms, the SS waits for a predetermined time corresponding to a predetermined backoff value at step 719. The waiting time of the T3 timer and the other waiting time corresponding to the backoff value result in an access attempt interval at step 731. Provided that the initial ranging response message is received from the second BS during the waiting time of the T3 timer, there is no need for the SS to perform additional operations using the above initial ranging process. It should be noted that FIG. 7 assumes a predetermined condition where the initial ranging response message to the first initial ranging request message is not received.

As described above, if the initial ranging response message to the first initial ranging request message has not been received during the waiting time of the T3 timer, the SS transmits access probe data with a second initial ranging request message to the second BS at step 733, after the lapse of the waiting time corresponding to the backoff value. In this case, it should be noted that the access probe for transmitting the second initial ranging request message is called a second access probe denoted by Access Probe #2. The transmission power for transmitting the second access probe is determined to be higher than that of the first access probe by the power step in order to solve a poor wireless channel environment between the second BS and the SS. The SS performs an operation of the access attempt interval (i.e., the T3 timer setup operation) at a time of transmitting the second access probe, such that it waits for the initial ranging response message associated with the second initial ranging request message to be received from the second BS. Provided that the SS does not receive the initial ranging response message associated with the second initial ranging request message during the waiting time of the T3 timer, the SS performs consecutive operations such as a standby operation in response to the predetermined backoff value.

Figure 8:
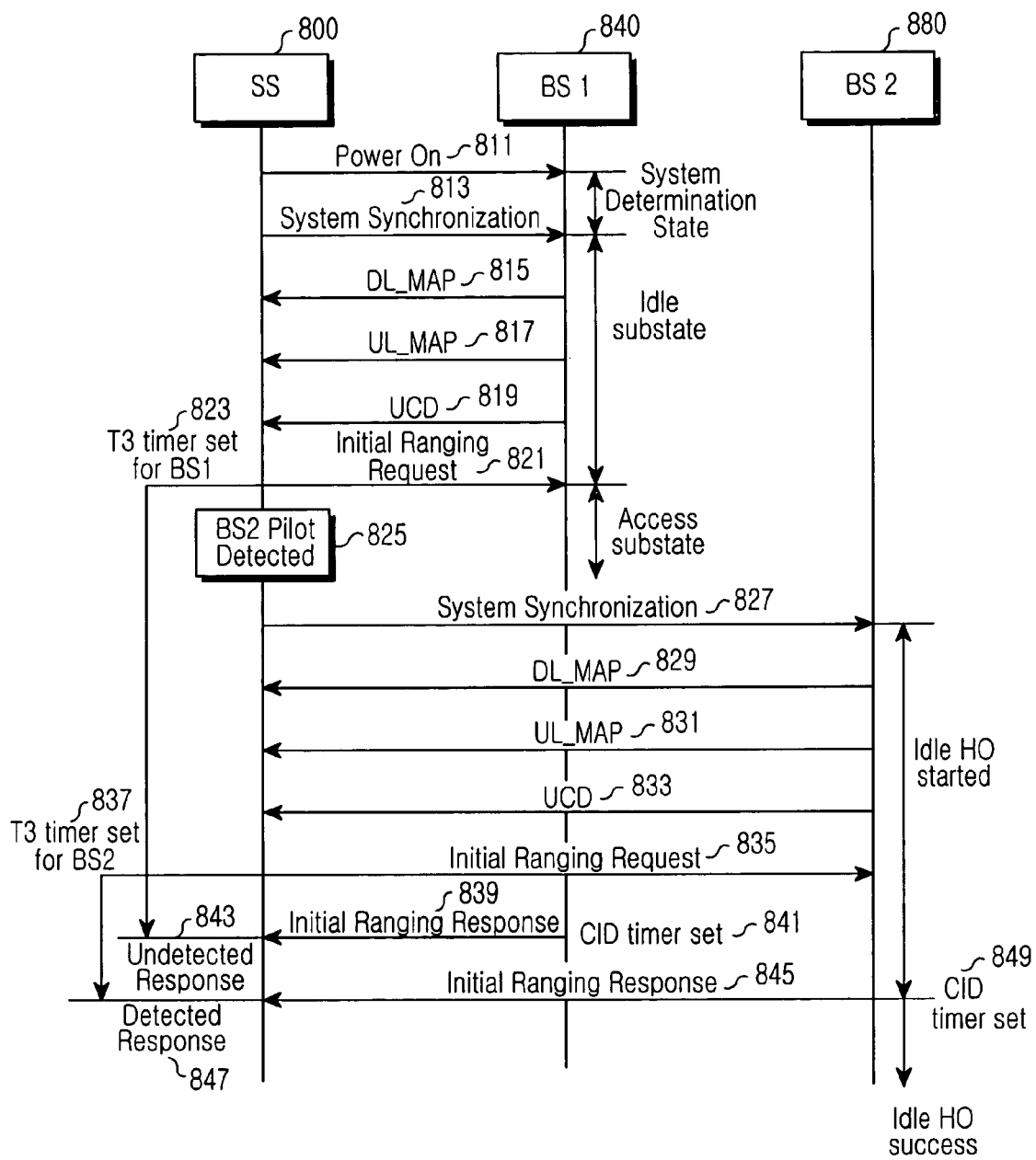
FIG. 8 is a flow chart illustrating an initial ranging process when the SS is positioned in the handoff area in the BWA communication system using the OFDM/OFDMA scheme in accordance with a preferred embodiment of the present invention.

FIG. 8 is a flow chart illustrating an initial ranging process when the SS is located in the handoff area in the BWA communication system using the OFDM/OFDMA scheme in accordance with a preferred embodiment of the present invention. Referring to FIG. 8, the SS 800 is powered on at step 811, and monitors all the frequency bands having been previously allocated to the SS 800, such that it detects a pilot channel signal having a highest signal strength (i.e., the highest pilot CNR). It is determined that the SS 800 currently belongs to the first BS (BS1) 840, which has transmitted the pilot channel signal with the highest pilot CINR. The SS 800 receives a downlink frame preamble transmitted from the first BS 840, and establishes synchronization acquisition with the first BS 840 at step 813. If the synchronization acquisition has been established between the SS 800 and the first BS 840, the first BS 840 transmits the DL_MAP message, the UL_MAP message, and the UCD message to the SS 800 at steps 815, 817, and 819, respectively. In this case, the DL_MAP message, the UL_MAP message, and the UCD message are substantially multiplexed to one downlink frame and are then transmitted, such that their transmission order may not be a sequential order but a simultaneous order. It should be noted that FIG. 8 sequentially illustrates the DL_MAP message transmission, the UL_MAP message transmission, and the UCD message transmission for the convenience of description.

Upon receiving the DL_MAP message, the UL_MAP message, and the UCD message from the first BS 840, the SS continues to monitor neighbor BSs using the handoff-associated information (i.e., neighbor BSs-associated information) contained in the DL_MAP message. The SS 800 transmits the initial ranging request message to the first BS 840 using uplink information contained in the UL_MAP message and the ranging code information contained in the DL_MAP message at step 821. The SS 800 operates the T3 timer simultaneously with transmitting the initial ranging request message at step 823. In this case, the T3 timer operates during a predetermined setup time, and waits for the initial ranging response message associated with the initial ranging request message to be received from the first BS 840.

Provided that a specific BS (i.e., a second BS 880) capable of transmitting a pilot channel signal stronger than that of the first BS 840 during the operation time of the T3 timer at step 825, the SS 800 escapes from the waiting mode for receiving the initial ranging response message from the first BS 840, and establishes synchronization acquisition with the second BS 880 at step 827.

If the synchronization acquisition between the SS 800 and the second BS 880 has been established, the second BS 880 transmits the DL_MAP message, the UL_MAP message, and the UCD message to the SS 800 at steps 829, 831, and 833, respectively. The SS 800 having received the DL_MAP message, the UL_MAP message, and the UCD message from the second BS 880, continuously monitors neighbor BSs using the handoff-associated information (i.e., neighbor BS-associated information) contained in the DL_MAP message. The SS 800 transmits the initial ranging request message to the second BS 880 using the uplink information contained in the UL_MAP message and the ranging code information contained in the DL_MAP message at step 835. The SS 800 operates the T3 timer simultaneously with transmitting the initial ranging request message at step 837. In this case, the T3 timer transmits the initial ranging request message during a predetermined setup time, and waits for the initial ranging response message associated with the initial ranging request message to be received from the second BS 880.

The first BS 840 cannot detect a specific state where the SS 800 is handed off to the second BS 880, such that it transmits the initial ranging response message associated with the initial ranging request message of the SS 800 to the SS 800 at step 839. In this case, the first BS 840 assigns a CID (Connection ID) to the SS 800 at a time of transmitting the initial ranging response message, transmits the initial ranging response message, and operates a CID timer to remove the CID when there is no response generated from the SS 800. The CID timer counts a predetermined setup time. If the CID timer has expired after the lapse of the predetermined setup time, the first BS 840 removes the CID assigned to the SS 800 to prevent unnecessary radio resources from being wasted. Accordingly, the SS 800 has been handed off to the second BS 800, such that it cannot detect the initial ranging response message transmitted from the first BS 840 at step 843.

The second BS 880 transmits the initial ranging response message associated with the initial ranging request message of the SS 800 to the SS 800 at step 845. Provided that the SS 800 is handed off to the other BS instead of the second BS 880, the second BS 880 cannot detect the handoff state of the SS 800. Therefore, the second BS 880 assigns a CID to the SS 800, transmits the initial ranging response message to the SS 800, and operates the CID timer to remove the CID when there is no response generated from the SS 800 at step 849. If there is no response generated from the SS 800 while the CID timer expires during the setup time, the second BS 880 removes the CID assigned to the SS 800 in the same way as in the first BS 840. The SS 800 detects the initial ranging response message transmitted from the second BS 880 in such a way that the initial ranging process is completed at step 847.

Figure 9:
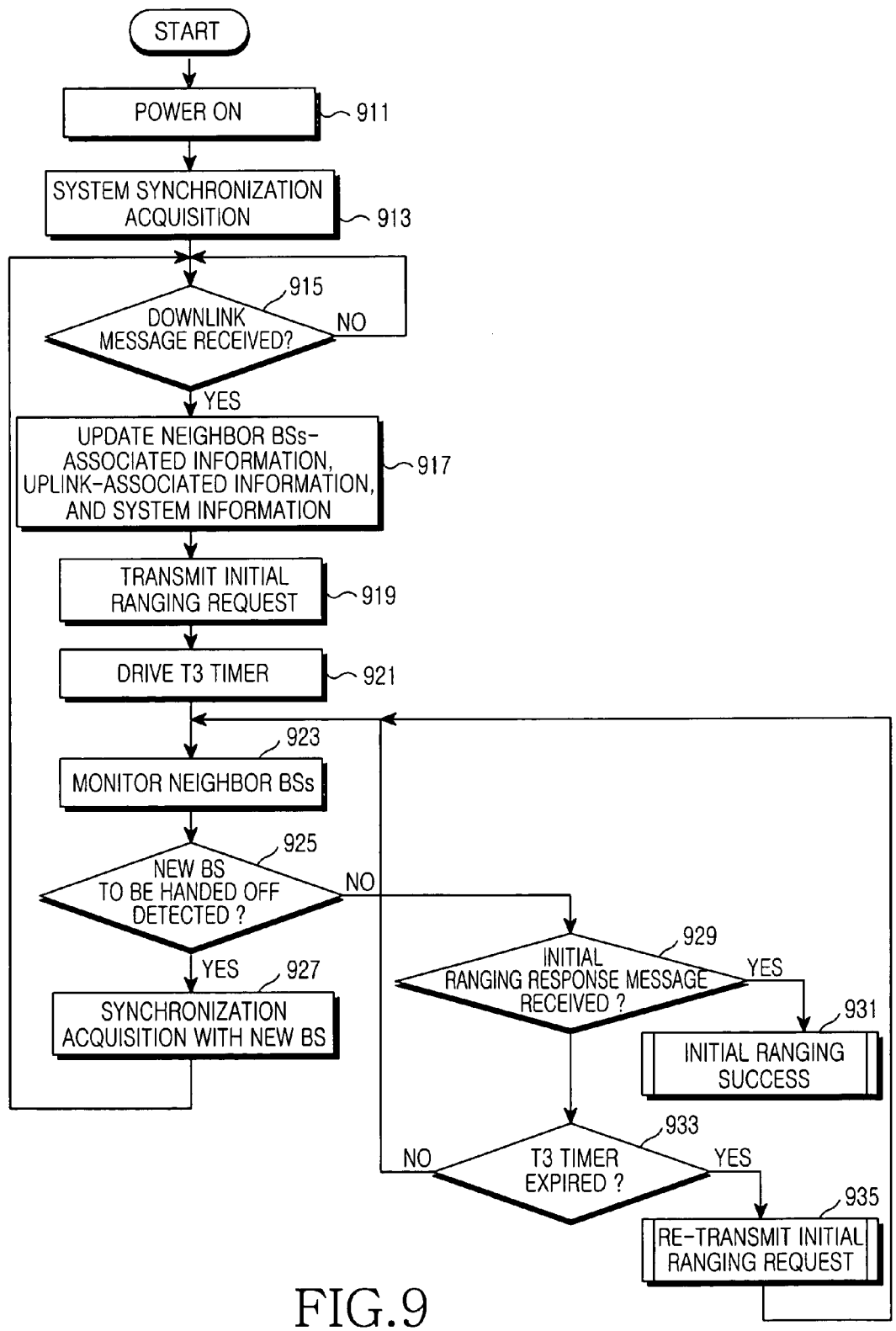
FIG. 9 is a flow chart illustrating operations of the SS 800 illustrated in FIG. 8 in accordance with a preferred embodiment of the present invention.

FIG. 9 is a flow chart illustrating operations of the SS 800 illustrated in FIG. 8 in accordance with a preferred embodiment of the present invention. Referring to FIG. 9, the SS 800 is powered on at step 911 and monitors all the frequency bands having been previously allocated to the SS 800, such that it detects a pilot channel signal having the highest signal strength (i.e., the highest pilot CINR) at step 913. It is determined that the SS 800 currently belongs to the first BS 840, which has transmitted the pilot channel signal with the highest pilot CINR. The SS 800 receives a downlink frame preamble transmitted from the first BS 840, and establishes synchronization acquisition with the first BS 840. The SS determines whether a downlink message is received from the first BS at step 915. In this case, the downlink message is composed of the DL_MAP message, the UL_MAP message, and the UCD message being currently broadcast by the first BS 840.

Upon receiving the downlink message from the first BS 840, the SS 800 goes to step 917. In step 917, the SS 800 analyzes a variety of messages acting as the downlink message, for example, the DL_MAP message, the UL_MAP message, and the UCD message, detects neighbor BSs-associated information, the uplink-associated information, and the system information, and updates the detected information.

The SS 800 transmits the initial ranging request message to the first BS 840 using the updated information at step 919. The SS 800 operates the T3 timer by transmitting the initial ranging request message at step 921, and monitors a plurality of neighbor BSs (e.g., six neighbor BSs) corresponding to the updated neighbor BSs-associated information at step 923. In this case, although the operation start time of the T3 timer is substantially equal to the monitoring start time of the neighbor BSs, it should be noted that the operation start time of the T3 timer and the monitoring start time of the neighbor BSs will be described sequentially for the convenience of description.

In step 925, the SS 800 determines whether a new BS to be handed off from among the monitored neighbor BSs is detected. The new BS to be handed off is a specific BS capable of transmitting a pilot channel signal stronger than a transmission pilot channel signal received from the first BS 840. For example, it is assumed that the new BS to be handed off is called a second BS 880.

Provided that the new BS to be handed off has been detected from among the neighbor BSs, the SS 800 proceeds to step 927, where the SS 800 establishes synchronization acquisition with the new BS (i.e., the second BS 880), and then returns to step 915, such that it repeats the aforementioned operations associated with the second BS 880 at step 915.

However, if no new BS to be handed off has been detected from among neighbor BSs at step 925, the SS 800 determines whether the initial ranging response message is received from the first BS 840 at step 929. If it is determined that the initial ranging response message has been received from the first BS 840 at step 929, the SS 800 determines that the initial ranging process has succeeded upon receiving the initial ranging response message at step 931, such that it terminates overall programs.

If it is determined that the initial ranging response message has not been received from the first BS 840 at step 929, the SS 800 determines whether the T3 timer has expired at step 933. If it is determined that the T3 timer has not expired, the SS 800 returns to step 923. However, if it is determined that the T3 timer has completed operation at step 933, the SS 800 determines that the initial ranging request message has resulted in a transmission failure, such that it re-transmits the initial ranging request message to the first BS 840 at a transmission power increased by a predetermined power step at step 935. After the initial ranging request message has been re-transmitted, the SS 800 returns to step 923 and the procedures are the same as in the initial transmission case of the initial ranging request message.

Figure 10:
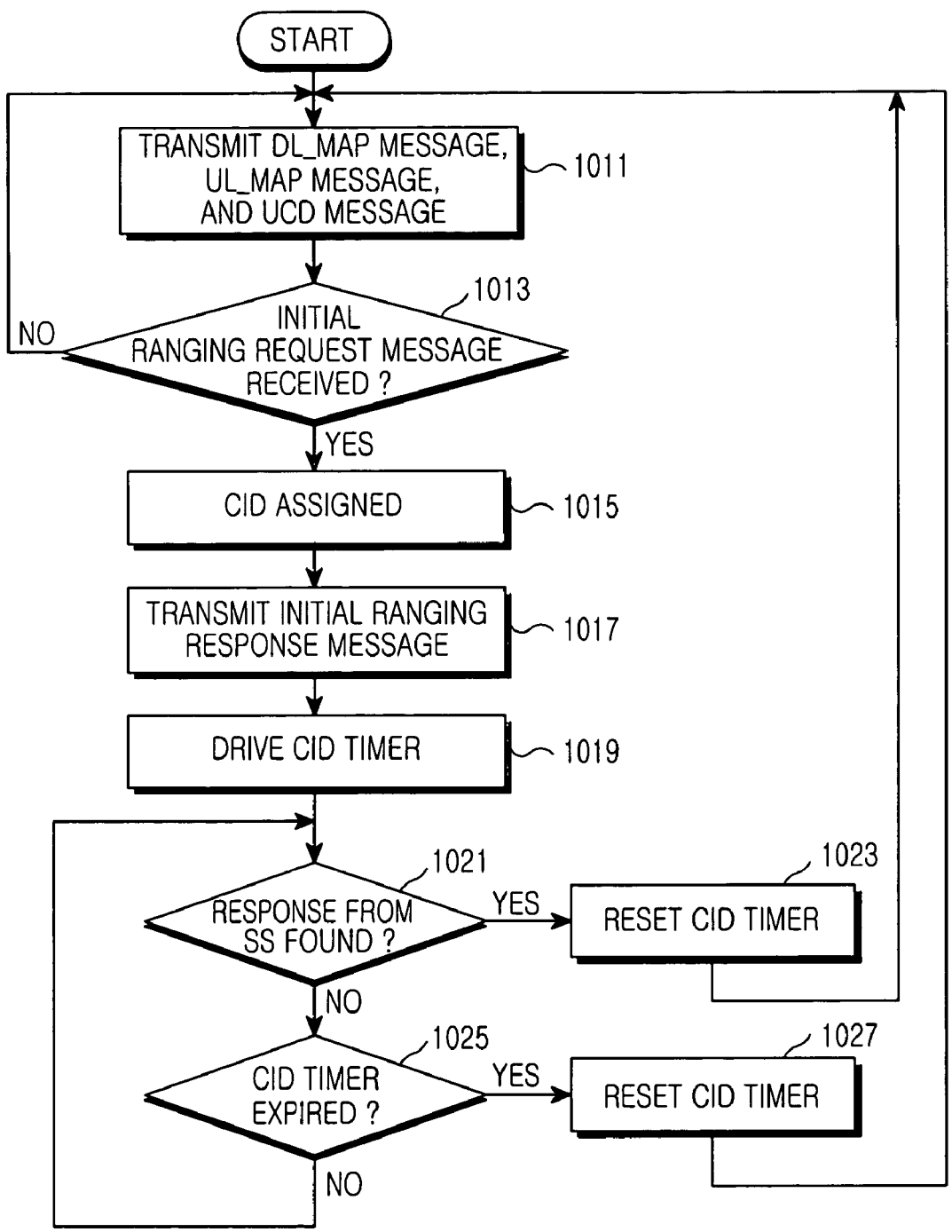
FIG. 10 is a flow chart illustrating operations of the first BS 840 illustrated in FIG. 8 in accordance with a preferred embodiment of the present invention.

FIG. 10 is a flow chart illustrating operations of the first BS 840 illustrated in FIG. 8 in accordance with a preferred embodiment of the present invention. Prior to describing FIG. 10 in detail, although the first BS 840 and the second BS 880 are substantially operated in the same manner, it should be noted that only the first BS 840 will hereinafter be disclosed for illustrative purposes for the convenience of description.

Referring to FIG. 10, the first BS 840 transmits the DL_MAP message, the UL_MAP message, and the UCD message via a downlink at step 1011. The first BS 840 determines whether the initial ranging request message is received from a SS (e.g., the SS 800) at step 1013. When it is determined that the initial ranging request message has been received from the SS 800, the first BS 840 assigns a CID to the SS 800. The first BS 840 transmits the initial ranging response message associated with the initial ranging request message to the SS 800 at step 1017. If the first BS 840 has transmitted the initial ranging response message at step 1017, it begins to operate the CID timer at step 1019, and the proceeds to step 1021.

The first BS 840 determines whether there is a response generated from the SS 800 at step 1021 in order to determine whether any signal is received from the SS 800 after the initial ranging response message has been transmitted. If it is determined that a response signal has been generated from the SS 800 at step 1021, the first BS 840 resets the CID timer at step 1023, and returns to step 1011. However, if it is determined that there is no response generated from the SS 800 at step 1021, the first BS 840 determines whether the CID timer has expired at step 1025.

If it is determined that the CID timer has not expired in step 1025, the first BS 840 returns to step 1021. If it is determined that the CID timer has expired at step 1025, the first BS 840 resets the CID timer at step 1027, and returns to step 1011.

Figure 11:
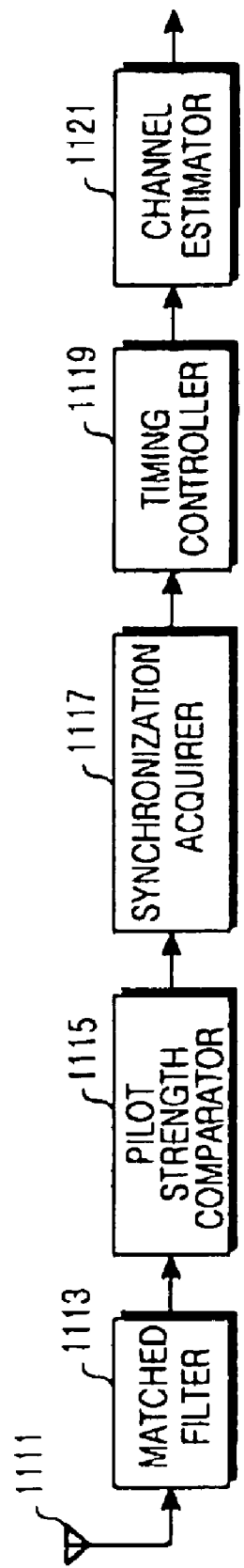
FIG. 11 is a block diagram illustrating an internal configuration of the SS for performing inventive functions in accordance with a preferred embodiment of the present invention.

FIG. 11 is a block diagram illustrating an internal configuration of the SS for performing inventive functions in accordance with a preferred embodiment of the present invention. Prior to describing FIG. 11 in detail, it should be noted that the SS is powered on, and monitors all the frequency bands having been previously allocated to the SS, such that it detects a pilot channel signal having the highest signal strength (i.e., the highest pilot CINR). It is determined that the SS currently belongs to a specific BS, which has transmitted the pilot channel signal with the highest pilot CINR. As a result, if the SS is synchronized with the specific BS, it receives the DL_MAP message from the specific BS, and recognizes neighbor BSs-associated information on the basis of the DL_MAP message. FIG. 11 illustrates operations performed after the SS has recognized the neighbor BSs-associated information.

Referring to FIG. 11, upon receiving a pilot channel signal from an antenna 1111, the received pilot channel signal is transmitted to a matched filter 1113. The matched filter 1113 performs a matching-filtering process on the received pilot channel signal according to the current BS-associated information of the SS and the neighbor BSs-associated information, and outputs the matching-filtering result to a pilot strength comparator 1115. In this case, the matched filter 1113 performs a matching-filtering process on a center frequency of the current BS of the SS and individual center frequencies of the neighbor BSs (e.g., six neighbor BSs). The aforementioned operations of the matched filter 1113 can be denoted by Frequency Searching and Detection for N, wherein N=Number of Frequency of neighbor BSs.

The pilot strength comparator 1115 receives matching-filtered pilot channel signals from the matched filter 1113. More specifically, the pilot strength comparator 1115 receives a matching-filtered pilot channel signal of the current BS of the SS and individual matching-filtered pilot channel signals of the neighbor BSs from the matched filter 1113, and compares the strengths of the received signals with each other. The pilot strength comparator 1115 transmits center frequency information corresponding to the matching-filtered pilot channel signal having the highest signal strength to an synchronization acquirer 1117.

The synchronization acquirer 1117 establishes synchronization with the output signal of the pilot strength comparator 1115 in response to the center frequency information, and outputs the synchronization result to a timing controller 1119. The timing controller 1119 controls a real time offset using the output information of the synchronization acquirer 1117, and outputs the time-offset control result to a channel estimator 1121. The channel estimator 1121 receives the output signal of the timing controller 1119, and performs channel estimation on the received signal.

As is apparent from the above description, the present invention provides a BWA communication system using an OFDM/OFDMA scheme, such that it can perform an idle handoff operation using an initial ranging process of the IEEE 802.16e communication system, resulting in a guarantee of the SS's mobility. Therefore, the present invention guarantees a high transfer rate and provides free mobility to the IEEE 802.16e communication system.

Although the preferred embodiments of the present invention have been disclosed herein for illustrative purposes, those skilled in the art will appreciate that various modifications, additions, and substitutions are possible, without departing from the scope and spirit of the present invention as disclosed in the accompanying claims.

What is claimed is:

1. A subscriber station (SS) cell reselection method in a communication system using at least one of an Orthogonal Frequency Division Multiplexing (OFDM) scheme and an Orthogonal Frequency Division Multiple Access (OFDMA) scheme, comprising the steps of:

a) receiving neighbor base station (BS) information on a plurality of neighbor BSs associated with a plurality of cells adjacent to a cell and uplink-associated information needed for transmitting data from the SS to a first BS, from the first BS for controlling the cell in which the SS is currently located;

b) transmitting a first request as a request of synchronization information needed for synchronizing the SS and the first BS, to the first BS;

c) monitoring the plurality of neighbor BSs according to the neighbor BS information; and d) performing a cell reselection with a second BS, which is one of the plurality of neighbor BSs according to the monitored result, wherein performing the cell reselection with the second BS further comprises a step d1) of transmitting, to the second BS, a second request as a request for synchronization information needed for synchronizing the SS and second BS the.

2. The method as set forth in claim 1, wherein the neighbor BS information includes a number of the neighbor BSs, BS IDentifiers (IDs) of the neighbor BSs, and center frequencies of the neighbor BSs, and each of the BS IDs is an ID of each of the neighbor BSs, and each of the center frequencies is a center frequency of the each of the neighbor BSs.

3. The method as set forth in claim 2, wherein the neighbor BS information further includes information indicating whether each of the neighbor BS supports a cell reselection operation using the synchronization information, and frame offsets of the neighbor BSs, wherein each of the frame offsets is a frame of the each of the neighbor BSs.

4. The method as set forth in claim 1, wherein the step (c) for monitoring the neighbor BSs comprises the step of:

c1) monitoring strengths of pilot channel signals received from the neighbor BSs, wherein each of the strengths of the pilot channel signals is a strength of each of the neighbor BSs.

5. The method as set forth in claim 4, wherein the step (d) for performing the cell reselection with the second BS which is one of the plurality of neighbor BSs according to the monitored result, comprises:

d1) when there is a specific strength that is greater than that of a pilot channel signal received from the first BS in the strengths of the pilot channel signals received from the neighbor BSs, determining tat a neighbor BS that has transmitted a pilot channel signal with the specific strength is determined to be the second BS; and d2) performing the cell reselection with the second BS.

6. The method as set forth in claim 1, further comprising the step of:

e) after the determination, controlling the SS not to wait for a response to the first request to be received from the first BS.

7. The method as set forth in claim 1, further comprising the step of:

f) when a response to the second request is not received from the second BS during a setup time period, re-transmitting the second request to the second BS, after a lapse of a time period corresponding to a backoff value.

8. The method as set forth in claim 7, wherein a transmission power used for re-transmitting the second request is greater than a transmission power used for transmitting the second request.

9. A cell reselection method using in a communication system using at least one of an Orthogonal Frequency Division Multiplexing (OFDM) scheme and an Orthogonal Frequency Division Multiple Access (OFDMA) scheme, comprising the steps of:

a) broadcasting, by a first base station (BS) and a second BS, neighbor BS information and initial ranging information, allocated to a subscriber station (SS);

b) receiving, by the SS, initial ranging information broadcast from the first BS;

c) transmitting, by the SS, an initial ranging request to the first BS using the initial ranging information;

d) monitoring, by the SS, neighbor BSs corresponding to the neighbor BS information received from the first BS;

e) receiving, by the SS, initial ranging information broadcast from the second BS, when it is determined that a cell reselection is needed during the monitoring of the neighbor BSs;

f) transmitting, by the SS, an initial ranging request to the second BS using initial ranging information received from the second BS;

g) transmitting, by the first BS, when the first BS detects the initial ranging request, an initial ranging response to the initial ranging request, to the SS;

h) determining, by the first BS, whether a response by the SS is received during a setup time period, after transmitting the initial ranging response; and j) determining, by the first BS, whether the cell reselection of the SS has been performed, according to the determination result from step h).

10. The method as set forth in claim 9, wherein the neighbor BS information includes a number of the neighbor BSs, BS IDentifiers (IDs) of the neighbor BSs, and individual center frequencies of the neighbor BSs, and each of the BS IDs is an ID of each of the neighbor BSs, and each of the center frequencies is a center frequency of the each of the neighbor BSs.

11. The method as set forth in claim 10, wherein the neighbor BS information further includes information indicating whether each of the neighbor BS supports a cell reselection operation using an initial ranging process, and frame offsets of the neighbor BSs, and each of the frame offsets is a frame offset of each of the neighbor BSs.

12. The method as set forth in claim 9, wherein the step of monitoring the neighbor BSs comprises the step of monitoring strengths of pilot channel signals received from the neighbor BSs, and each of the strengths of the pilot channel signals is a strength of each of the neighbor BSs.

13. The method as set forth in claim 12, wherein when there is a specific strength that is greater than a strength of a pilot channel signal received from the first BS in the strengths of the pilot channel signals received from the neighbor BSs, the second BS is determined as the BS that has been transmitted the pilot channel signal with the specific strength.

14. The method as set forth in claim 9, wherein transmission power used for transmitting the initial ranging request to the first BS is identical to the transmission power used for transmitting the initial ranging request to the second BS.

15. The method as set forth in claim 9, further comprising the step of:
k) when an initial ranging as a response to a first initial ranging request as the initial ranging request transmitted to the second BS is not received from the second BS during a setup time period, re-transmitting the first initial ranging request to the second BS after a lapse of a time period corresponding to a backoff value.

16. The method as set forth in claim 15, wherein a transmission power used for re-transmitting the first initial ranging request is greater than a transmission power used for transmitting the first initial ranging request.

17. The method as set forth in claim 9, wherein the step of determining, by the first BS, whether cell reselection of the SS has been performed comprises the step of
determining that cell reselection of the SS has been performed when there is no response received from the SS during the setup time period.

18. The method as set forth in claim 9, further comprising the step of
canceling, by the first BS, a call connection state with the SS when it is determined that the cell reselection of the SS has been performed.

19. A cell reselection system in a communication system using at least one of an Orthogonal Frequency Division Multiplexing (OFDM) scheme and an Orthogonal Frequency Division Multiple Access (OFDMA) scheme, comprising:
a first Base Station (BS);
a second BS; and
a Subscriber Station (SS) for receiving neighbor BS information on a plurality of neighbor BSs associated with a plurality of cells adjacent to a cell and uplink-associated information needed for transmitting data from the SS to the first BS, from the first BS for controlling the cell in which the SS is currently located, transmitting a first request as a request of synchronization information needed for synchronizing the SS and the first BS, to the first BS, monitoring the plurality of neighbor BSs according to the neighbor BS information, and performing a cell reselection with the second BS which is one of the plurality of neighbor BSs according to the monitored result,
wherein the SS transmits, to the second BS, a second request as a request of synchronization information needed for synchronizing the SS and the second BS, according to a result of the performing of the reselection.

20. The system as set forth in claim 19, wherein the neighbor BS information includes a number of the neighbor BSs, BS identifiers(IDs) of the neighbor BSs, and center frequencies of the neighbor BSs, and each of the BS IDs is an ID of each of the neighbor BSs, and each of the center frequencies is a center frequency of the each of the neighbor BSs.

21. The system as set forth in claim 20, wherein the neighbor BS information further includes information indicating whether the each of the neighbor BSs supports a cell reselection operation using the synchronization information, and frame offsets of the neighbor BSs, and each of the frame offsets is a frame offset of each of the neighbor BSs.

22. The system as set forth in claim 19, wherein the SS monitors strengths of pilot channel signals received from the neighbor BSs, and each of strengths of the pilot channel signals is a strength of each of the neighbor BSs.

23. The system as set forth in claim 22, wherein the SS determines that a neighbor BS that has transmitted a pilot channel signal with a specific strength is determined to be the second BS when there is the specific strength that is greater than that of a pilot channel signal received from the first BS in the strengths of the pilot channel signals received from the neighbor BSs, and performs the cell reselection with the second BS.

24. The system as set forth in claim 19, wherein the SS controls the SS not to wait for a response to the first request to be received from the first BS according to the result of the performing of the cell reselection.

25. The system as set forth in claim 19, wherein the SS retransmits the second request to the second BS, after a lapse of a time period corresponding to a backoff value when a response to the second request is not received from the second BS during a setup time period.

26. The system as set forth in claim 25, wherein a transmission power used for re-transmitting the second request is greater than a transmission power used for transmitting the second request.

27. A Base Station (BS) cell reselection method in a communication system using at least one of an Orthogonal Frequency Division Multiplexing (OFDM) scheme and on Orthogonal Frequency Division Multiple Access (OFDMA) scheme, comprising the steps of:
broadcasting neighbor BS information and initial ranging information to a plurality of Subscriber Stations (SS) located within a cell controlled by the BS;
upon receiving an initial ranging request from an SS from among the plurality of SSs, transmitting an initial ranging response to the initial ranging request to the SS;
determining whether a response from the SS is received during a setup time period after transmitting the initial ranging response; and
determining whether a cell reselection of the SS has been performed according to the determined result, by determining that the cell reselection of the SS has been performed, when there is no response received from the SS during the setup time period,
wherein the neighbor BS information includes a number of the neighbor BSs, BS IDentifiers (IDs) of the neighbor BSs, and center frequencies of the neighbor BSs, and each of the BS IDs is an ID of each of the neighbor BSs, and each of the center frequencies is a center frequency of the each of the neighbor BSs, and
wherein the neighbor BS information further includes information indicating whether each of the neighbor BSs supports a cell reselection operation using an initial ranging process, and frame offsets of the neighbor BSs, and each of the BS IDs is an ID of each of the neighbor BSs, and each of the center frequencies is a center frequency of each of the neighbor BSs.

28. The method as set forth in claim 27, further comprising the step of canceling a call connection state with the SS, when it is determnined that the cell reselection of the SS has been performed.

29. A cell reselection system using at least one of an Orthogonal Frequency Division Multiplexing (OFDM) scheme and an Orthogonal Frequency Division Multiple Access (OFDMA) scheme, comprising:
a plurality of Subscriber Stations (SSs); and
a Base Station (BS) for broadcasting neighbor BS information to the plurality of SSs located within a cell, transmitting an initial ranging response to an initial ranging request to an SS upon receiving the initial ranging request from the SS from among the plurality of SSs, determining whether a response from the SS is received during a setup time period after transmitting the initial ranging response, and determining whether a cell reselection of the SS has been performed according to the determined result, wherein the neighbor BS information includes a number of neighbor BSs, BS IDentifiers (IDs) of the neighbor BSs, and center frequencies of the neighbor BSs, and each of the BS IDs is an ID of each of the neighbor BSs, and each of the center frequencies is a center frequency of the each of the neighbor BSs, and wherein the neighbor BS information further includes information indicating whether each of the neighbor BSs supports a cell reselection operation using an initial ranging process, and frame offsets of the neighbor BSs, and each of the frame offsets is a frame offset of each of the neighbor BSs.

30. The system as set forth in claim 29, wherein the BS cancels a call connection state with the SS, when it is determined that the cell reselection of the SS has been performed.

* * * * *